(12) United States Patent
Ikeda et al.

(10) Patent No.: US 7,148,921 B2
(45) Date of Patent: Dec. 12, 2006

(54) WHITE BALANCE ADJUSTMENT METHOD, IMAGE SENSING APPARATUS, PROGRAM, AND STORAGE MEDIUM

(75) Inventors: Eiichiro Ikeda, Kanagawa (JP); Takaaki Fukui, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 806 days.

(21) Appl. No.: 10/384,259

(22) Filed: Mar. 6, 2003

(65) Prior Publication Data
US 2003/0169348 A1 Sep. 11, 2003

(30) Foreign Application Priority Data
Mar. 6, 2002 (JP) ............................. 2002-060901

(51) Int. Cl.
*H04N 9/73* (2006.01)
*H04N 1/46* (2006.01)
(52) U.S. Cl. ................ 348/223.1; 348/225.1; 358/516
(58) Field of Classification Search ............. 348/223.1, 348/224.1–228; 358/516, 515, 517–518; 382/164, 190
See application file for complete search history.

(56) References Cited
U.S. PATENT DOCUMENTS
5,420,630 A * 5/1995 Takei ....................... 348/223.1
5,555,022 A * 9/1996 Haruki et al. ............ 348/223.1
6,707,491 B1 * 3/2004 Choi ........................ 348/223.1
6,795,115 B1 * 9/2004 Okazaki .................. 348/223.1
6,906,744 B1 * 6/2005 Hoshuyama et al. ..... 348/223.1

FOREIGN PATENT DOCUMENTS
| JP | A08-280041 | 10/1996 |
| JP | A11-289548 | 10/1999 |
| JP | A2000-224608 | 8/2000 |
| JP | A2001-036924 | 2/2001 |
| JP | A2001-103508 | 4/2001 |

OTHER PUBLICATIONS
Japanese Office Action dated May 12, 2006 of JP Application No. 2003-057217.

* cited by examiner

*Primary Examiner*—Ngoc-Yen Vu
*Assistant Examiner*—Gregory Madden
(74) *Attorney, Agent, or Firm*—Morgan & Finnegan, LLP (57) ABSTRACT

An object of this invention is to always obtain accurate white balance regardless of photographing conditions. To achieve this object, a white balance adjustment method includes a first color temperature calculation step of calculating a first color temperature from an image signal within a white detection range out of image signals from an image sensing element, a second color temperature calculation step of calculating a second color temperature from an image signal within a chromatic color detection range out of image signals from the image sensing element, and a white balance adjustment step of adjusting white balance on the basis of the first and second color temperatures.

12 Claims, 8 Drawing Sheets

FIGURE SHOWING RANGES WHERE WHITE AND SKIN ARE DETECTED AT A LOW COLOR TEMPERATURE

FIGURE SHOWING RANGES WHERE WHITE AND SKIN ARE DETECTED AT A HIGH COLOR TEMPERATURE

FIGURE SHOWING RANGES WHERE WHITE AND SKIN ARE DETECTED AT A LOW COLOR TEMPERATURE

WHITE BALANCE ADJUSTMENT METHOD, IMAGE SENSING APPARATUS, PROGRAM, AND STORAGE MEDIUM

FIELD OF THE INVENTION

The present invention relates to a technique of adjusting the white balance of an image pickup apparatus such as a digital camera or digital video camera.

BACKGROUND OF THE INVENTION

The white balance device of a conventional image sensing apparatus will be explained.

An image signal output from an image sensing element is converted into a digital signal via an A/D converter. The digital signal output from the image sensing element is divided into an arbitrary number of blocks. For each block, color evaluation values $$Cx=(R-B)/Y$$

$$Cy=(R+B-2G)/Y$$

$$Y=(R+G+B)/2$$

are calculated (example of transformations for primary color signals).

A block where a preset white detection range to be described later contains color evaluation values (Cx and Cy) is assumed to be white. The integral values (SumR, SumG, and SumB) of color pixels of the block assumed to be white are calculated. White balance gains are calculated from these integral values:

$$kWB\_R=1.0/SumR$$

$$kWB\_G=1.0/SumG$$

$$kWB\_B=1.0/SumB$$

Figure 2:
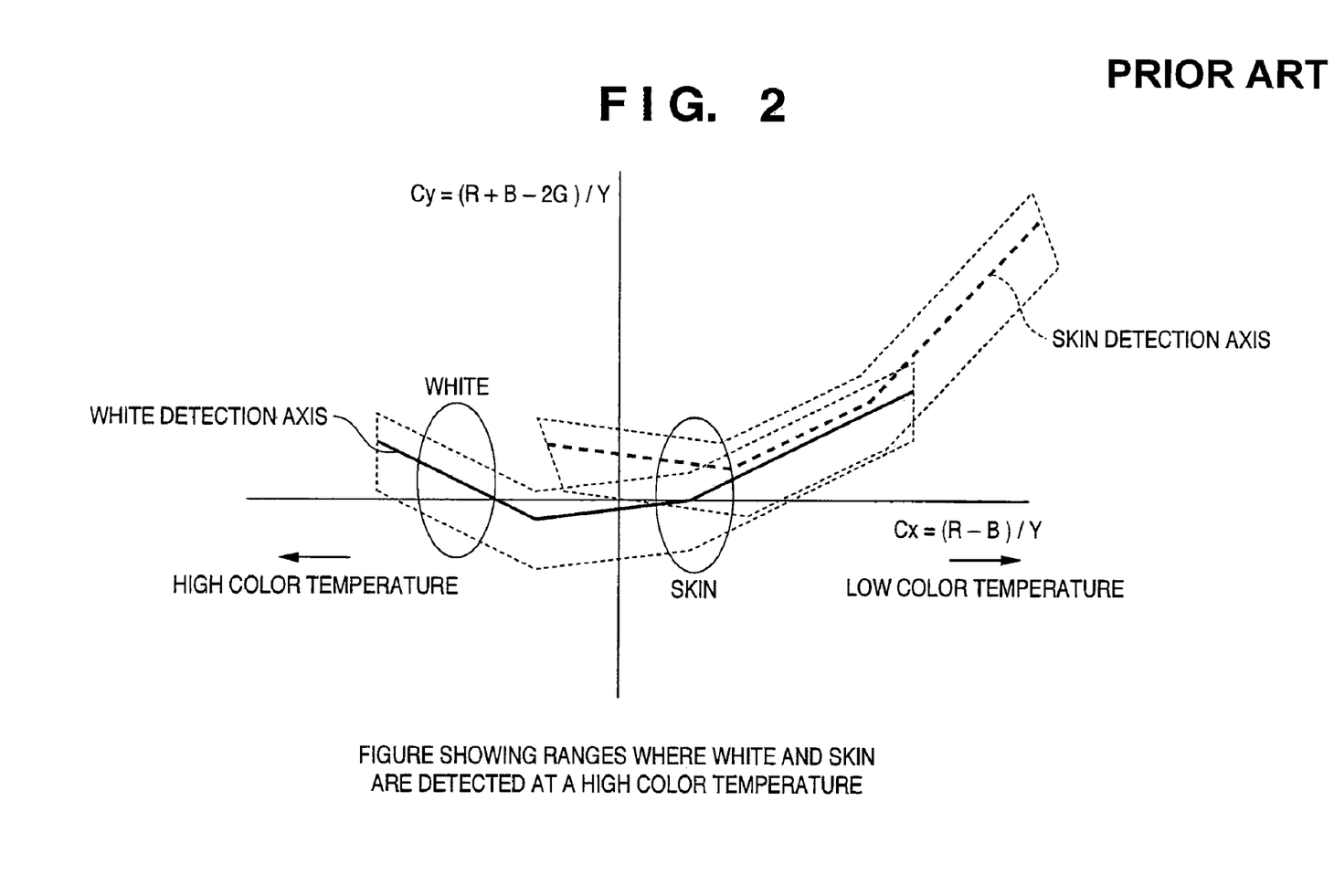
FIG. 2 is a graph showing white and skin detection axes (areas)

FIG. 2 is a graph showing an example of the white detection range. White is sensed every arbitrary color temperature step under a light source ranging from a high color temperature to a low color temperature. A color evaluation value is calculated from a signal value obtained by an image sensing element, and plotted. As is represented by (a) in FIG. 2, a white determination line from a high color temperature to a low color temperature is obtained. In practice, even white slightly varies in spectral characteristics, and the line is given a small margin.

The conventional white balance detection device suffers the following problem.

For example, when a human skin is sensed by close-up under a high-color-temperature light source such as sunbeams, the color evaluation value of a white object under the sun distributes like (White in FIG. 2). The color evaluation value of the human skin distributes at almost the same position as that of the white color under a low-color-temperature light source, like (Skin in FIG. 2). For a large area of the skin color, the light source is misjudged as a lower-color-temperature light source than an actual one.

To avoid such misjudgment, the conventional white balance device is designed not to detect a low-color-temperature light source by narrowing the white detection range to a range "White" on the assumption that light is external light for a high object illuminance at high possibility.

However, the conventional white balance device cannot cope with a very high illuminance of tungsten light in a studio or the like, whose color temperature is low. For a dark object in the shade or evening, the white balance device must detect light sources from a high-color-temperature one to a low-color-temperature one. The white detection range must be widened, and misjudgment caused by a deviation to the skin color cannot be prevented.

SUMMARY OF THE INVENTION

The present invention has been made to overcome the conventional drawbacks, and has as its object to always obtain accurate white balance regardless of photographing conditions.

To solve the above problems and achieve the above object, according to the first aspect of the present invention, a white balance adjustment method is characterized by comprising a first color temperature calculation step of calculating a first color temperature from an image signal within a white detection range out of image signals from an image sensing element, a second color temperature calculation step of calculating a second color temperature from an image signal within a chromatic color detection range out of image signals from the image sensing element, and a white balance adjustment step of adjusting white balance on the basis of the first and second color temperatures.

According to the second aspect of the present invention, a program is characterized by causing a computer to execute the white balance adjustment method.

According to the third aspect of the present invention, a storage medium is characterized by computer-readably storing the program.

According to the fourth aspect of the present invention, an image sensing apparatus is characterized by executing the white balance adjustment method.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Preferred embodiments of the present invention will be described below with reference to the accompanying drawings.

(First Embodiment)

Figure 1:
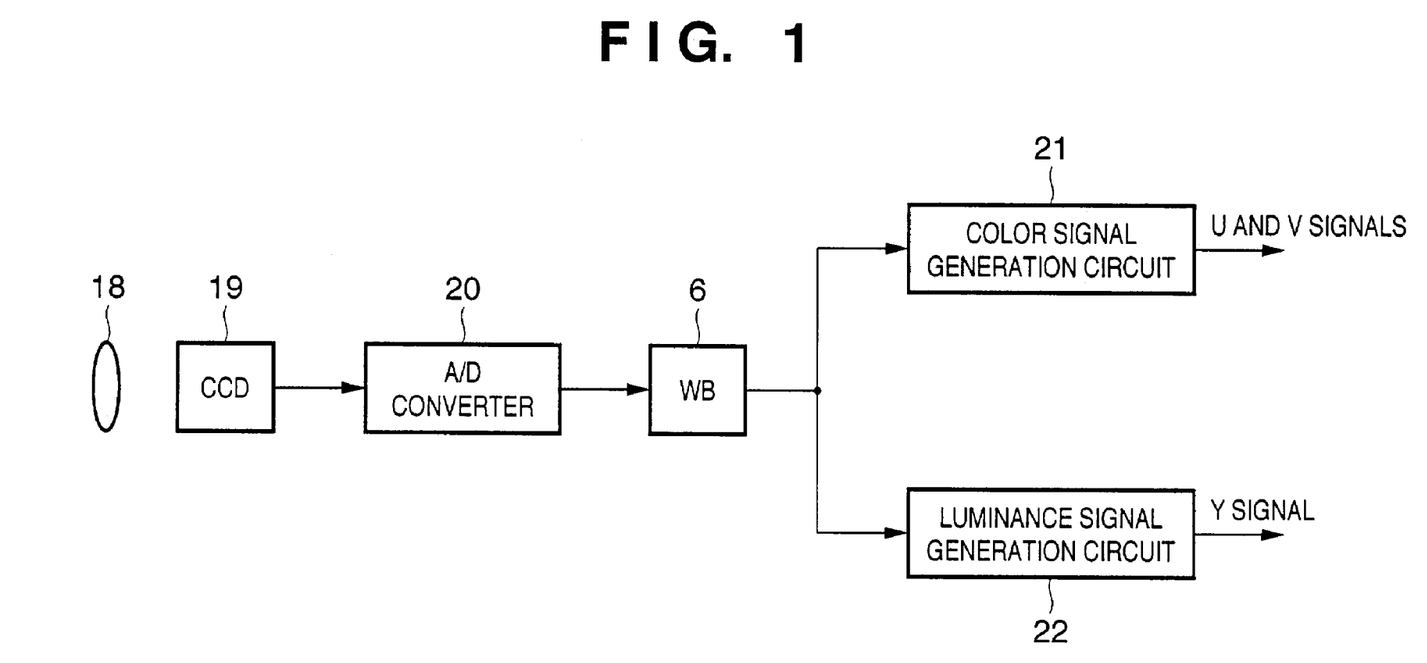
FIG. 1 is a block diagram showing the schematic arrangement of an image sensing apparatus having a white balance device according to an embodiment of the present invention.

FIG. 1 is a block diagram showing the schematic arrangement of an image sensing apparatus having a white balance device according to the first embodiment of the present invention.

In FIG. 1, light having passed through a lens 18 is received by a CCD 19, and an output signal from the CCD is converted into a digital signal via an A/D converter 20. The white balance is adjusted by a WB circuit 6 according to the first embodiment of the present invention. A color signal generation circuit 21 generates color difference signals U and V, and a luminance signal generation circuit generates a luminance signal Y, obtaining a color image.

Figure 8:
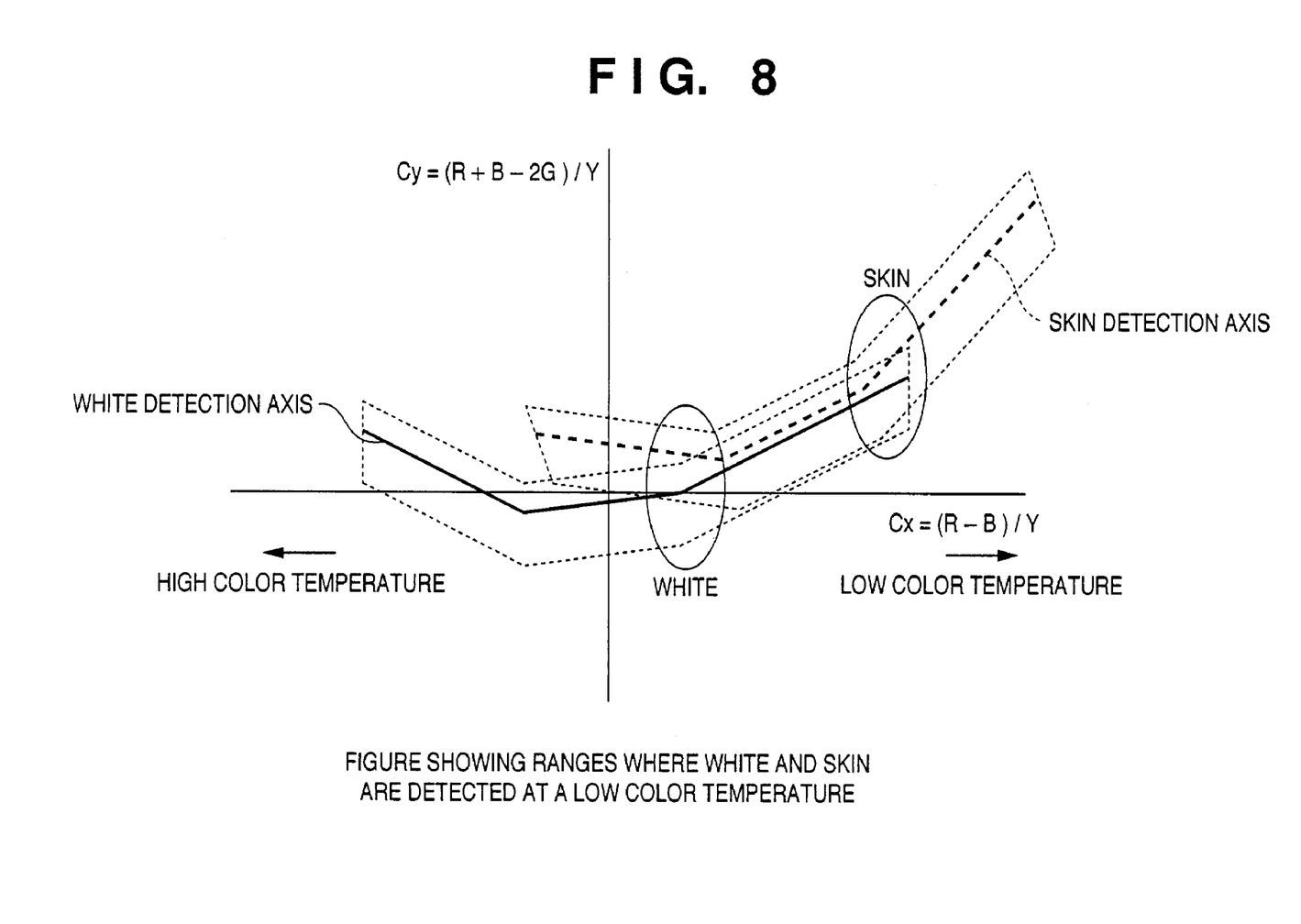
FIG. 8 is a graph showing white and skin detection axis (areas).

FIG. 2 and FIG. 8 are graphs showing a white detection range and skin color detection range. This embodiment will exemplify an image sensing element using a primary color filter.

In FIG. 2, an area shown as "White" is indicative of an area in which white signal is detected from a picked up image in a light source whose temperature is high. And an area shown as "Skin" is indicative of an area in which skin color signal is detected from a picked up image in a light source whose temperature is high.

In FIG. 8, an area shown as "White" is indicative of an area in which white signal is detected from a picked up image in a light source whose temperature is low. And an area shown as "Skin" is indicative of an area in which skin color signal is detected from a picked up image in a light source whose temperature is low.

The white detection range is obtained by calculating $$Cx=(R-B)/Y$$

$$Cy=(R+B-2G)/Y$$

$$Y=(R+G+B)/2 \quad (1)$$

from output values from an image sensing element which has photographed the white color at arbitrary steps from a high color temperature to a low color temperature, and plotting the calculated values along two-dimensional axes ((a) in FIG. 2). In FIG. 2, the X-axis corresponds to the color temperature of the light source, and the Y-axis corresponds to a correction amount in the green direction. After this method, the white detecting area is set previously.

The skin color detection range is also obtained by photographing a human skin at each color temperature and plotting the resultant values along the axes ((b) in FIG. 2). The skin color includes various colors such as white, black, and yellow. However, the value of hue is almost the same for each human skin, and the skin detection axis is created using an almost intermediate skin color. The skin detecting area is made by expanding the axes (b) in Y-axis.

Figure 5:
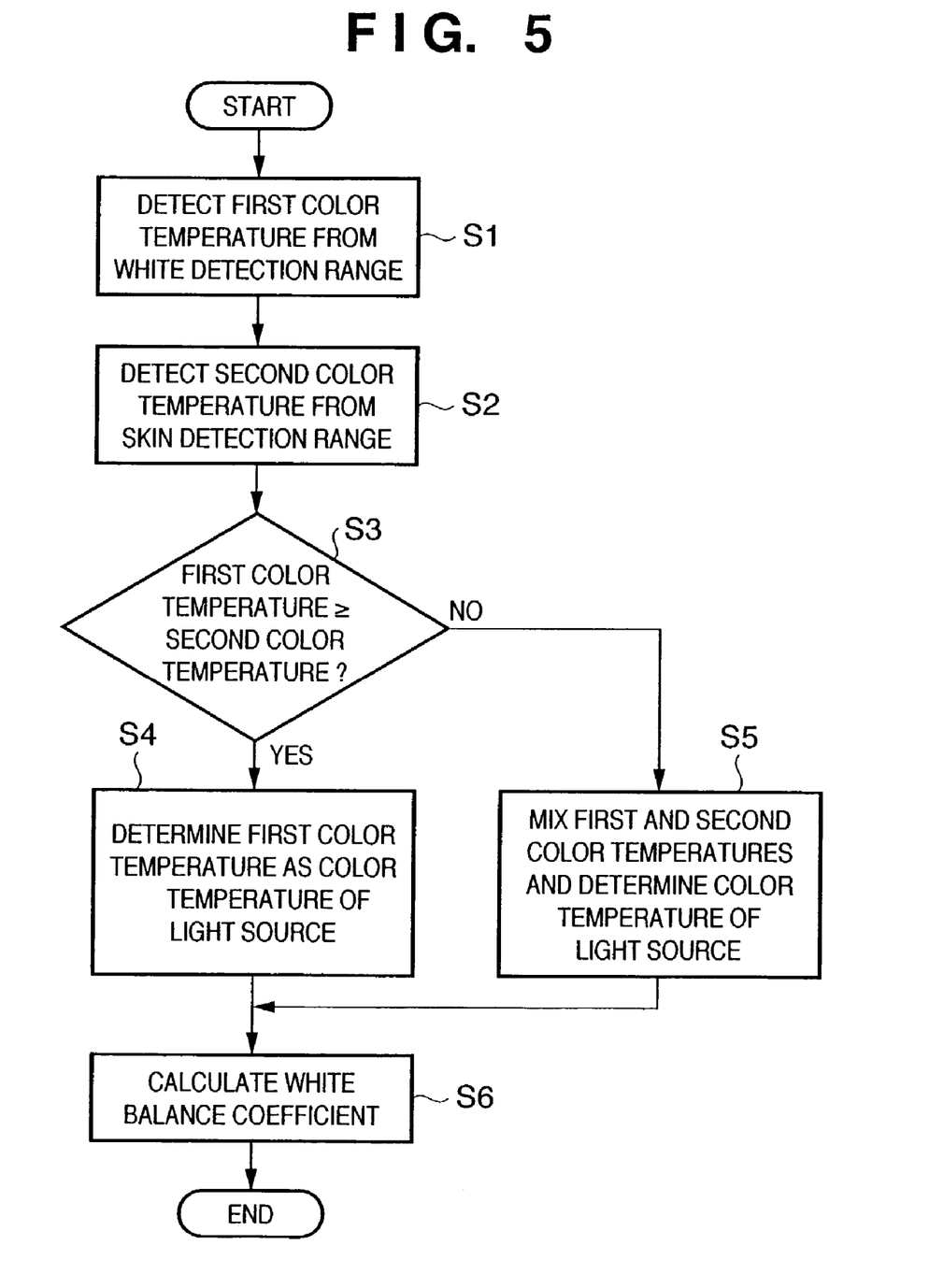
FIG. 5 is a flow chart showing the operation of the white balance device in the first embodiment.

An operation of detecting the white balance by using these detection axes according to the first embodiment will be explained with reference to the flow chart shown in FIG. 5.

Figure 3:
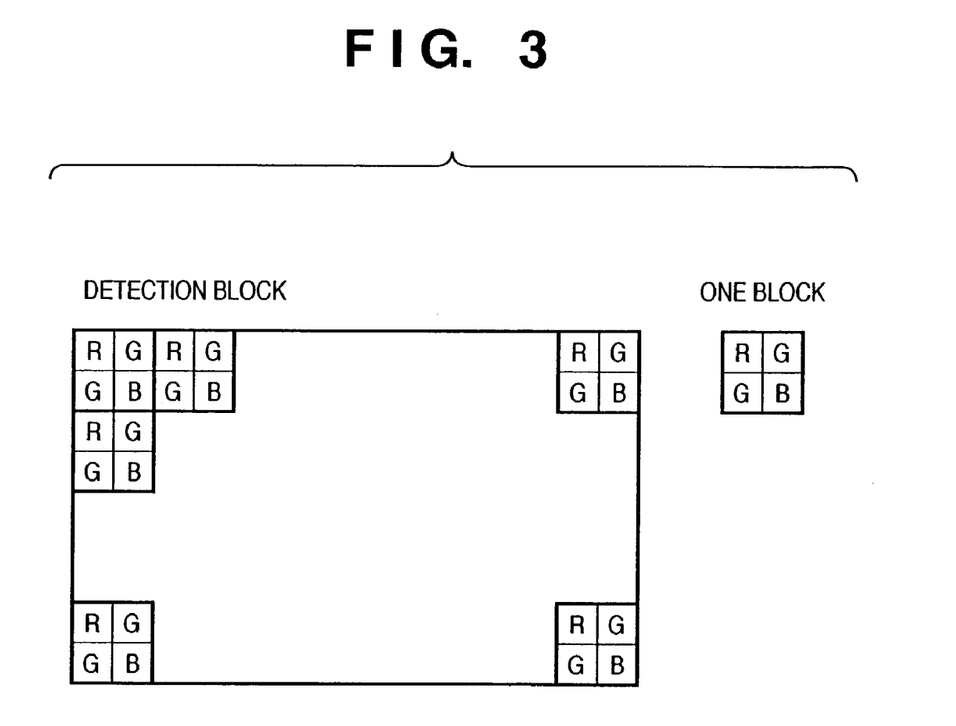
FIG. 3 is a view showing a color detection block.

One frame shown in FIG. 3 is divided into blocks of an arbitrary size. For each block, white evaluation values (Cx and Cy) are calculated based on color signals from an image sensing element. Whether the white evaluation values fall within the white detection range or skin detection range in FIG. 2 is checked.

Integral values SumRw, SumGw, and SumBw of output values from respective color filters of a block falling within the white detection range, and a total number SampleWNum of samples are calculated:

$$SumRw=\Sigma R(i)$$

$$SumGw=\Sigma G(i)$$

$$SumBw=\Sigma B(i)$$

$$SampleWNum=\Sigma Sample(i) \quad (2)$$

White evaluation values SumCxW and SumCyW are calculated from the integral values:

$$SumCxW=(SumRw-SumBw)/Yw$$

$$SumCyW=(SumRw+SumBw-2SumGw)/Yw$$

$$Yw=(SumRw+SumGr+SumBg)/2 \quad (3)$$

The color temperature (CTempFromWhite) of the object (field of view) is predicted from these white evaluation values (step S1). Since the X-axis for the white detection axis corresponds to the color temperature, the color temperature of the light source can be calculated as far as Cx is known.

Similarly, the integral values of output values from respective color filters of a block falling within the skin detection range, and the total number of samples are calculated:

$$SumRskin, SumGskin, SumBskin, SampleSkinNum \quad (4)$$

Skin evaluation values SumCxSkin and SumCySkin are calculated from these integral values:

$$SumCxSkin=(SumRskin-SumBskin)/Yskin$$

$$SumCySkin=(SumRskin+SumBw-2SumGskin)/Yskin$$

$$Yskin=(SumRskin+SumGw+SumBskin)/2 \quad (5)$$

The color temperature (CTempFromSkin) of the object (field of view) is predicted from these skin evaluation values (step S2).

Figure 6:
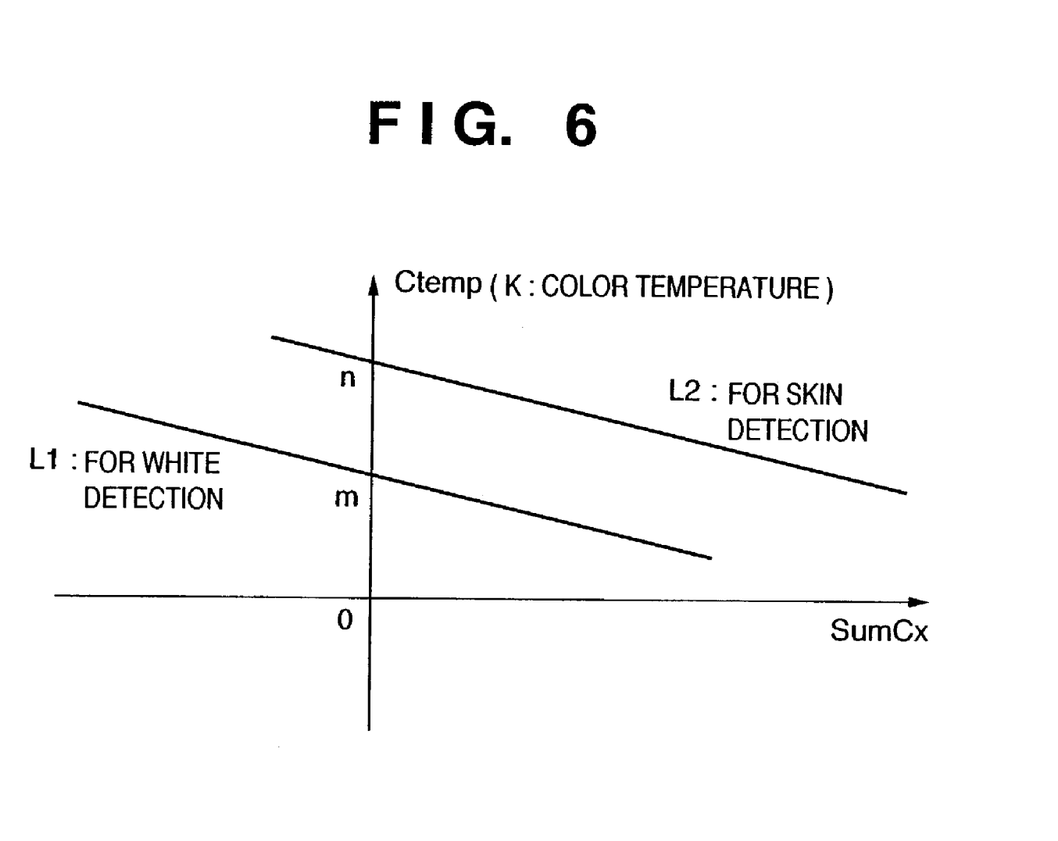
FIG. 6 is a graph showing a relation between SumCx and color temperature.

FIG. 6 shows the relation between SumCx and color temperature for explaining the method to predict each color temperature from SumCxW or SumCxSkin obtained in Step S2.

L1 in FIG. 6 is used in case of obtaining color temprature "CtempFromWhite" from SumCxW.

$$L1: Ctemp=\alpha \times SumCx+m \quad (6)$$

(α: negative coefficient, m: approximately 4000K)

L2 in FIG. 6 is used in case of obtaining color temperature "CtempFromSkin" from SumCx Skin.

$$L2: Ctemp=\alpha \times SumCx+n$$

$$(n>m) \quad (7)$$

In addition, L1 in FIG. 6 is obtained previously by plotting values of SumCx corresponding that a white object such a white paper is picked up in each different color temperature. And L2 in FIG. 6 is obtained previously by plotting values of SumCx corresponding that a skin object is picked up in different color.

The color temperature calculated from the white evaluation values and the color temperature calculated from the skin evaluation values are compared (step S3).

If an accurate color temperature is detected by white detection, $$CTempFromWhite \geq CTempFromSkin \quad (8)$$

(YES in step S3). The color temperature of the white detection result can be determined as a final color temperature of the light source (step S4). Also when the color temperature of the white detection result is higher than that of the skin detection result, the color temperature of the white detection result can be determined as a final color temperature of the light source.

If the skin color occupies a large area regardless of the value of color temperature, the skin color signal distributes much on the low color temperature side along the white detection axis, therefore CTempFromWhite as the value predicted from the white detecting area is smaller than CTempFromSkin predicted from the skin detecting area.

$$CTempFromWhite < CTempFromSkin \quad (9)$$

(NO in step S3). This represents a deviation to the skin color. In this case, the skin detection result is output (step S5).

In case of picking up an image in low color temperature, a white image signal will be detected in the skin detecting area even if a skin object isn't in an image. Therefore that case will result in (9). However, the obtained color temperature "CtempFromSkin" from skin detecting area has no effect on a conclusive result of an obtained color temperature "CtempResult" by getting weighted average between Ctemp-FromWhite and CtempFromSkin, as described below.

However, digital switching between the white detection result and the skin detection result may cause white balance switching owing to a small scene shift. To prevent this, processing of calculating the weighted average of two coefficients at the ratio of the number of skin-detected samples (this processing will be referred to as sample count coefficient mixing hereinafter) is preferably executed. Sample count coefficient mixing processing will be exemplified.

AllSampleNumber represents the total number of blocks. The occupation percentage of the skin to the frame is determined from the sum of skin-detected sample points:

$$SkinSamplePercent = SampleSkinNum \times 100 / AllSampleNumber \quad (10)$$

The final object color temperature is calculated using SkinSamplePercent:

$$CTempResult = k \times CTempFromSkin + (1-k) \times CTempFromWhite \quad (11)$$

For example, for SkinSamplePercent$\geq$10%, the skin detection result is used by 100% (k=1). For SkinSamplePercent<10%, the white detection result is gradually mixed. For SkinSamplePercent=5%, 50% (k=0.5) of the skin detection result and 50% of the white detection result are mixed. For SkinSamplePercent=0%, 0% (k=0) of the skin detection result and 100% of the white detection result are mixed.

White balance process is performed based on the coefficients obtained like that (Step S6).

In addition, weighted average between CtempFromWhite and CtempFromSkin may be obtained not only in case of CtempFromWhite<CtemFromSkin, but also in case of CtempFromWhite$\geq$CtempFromSkin. This process is simpler than the process as described above.

As described above, the present embodiment can properly perform to adjust white balance of a picked up image regardless of color temperature of light source and detection of skin signals in the picked up image.

(Second Embodiment)

The second embodiment is different from the first embodiment in the method of mixing an object color temperature by white detection and an object color temperature by skin detection.

Figure 7:
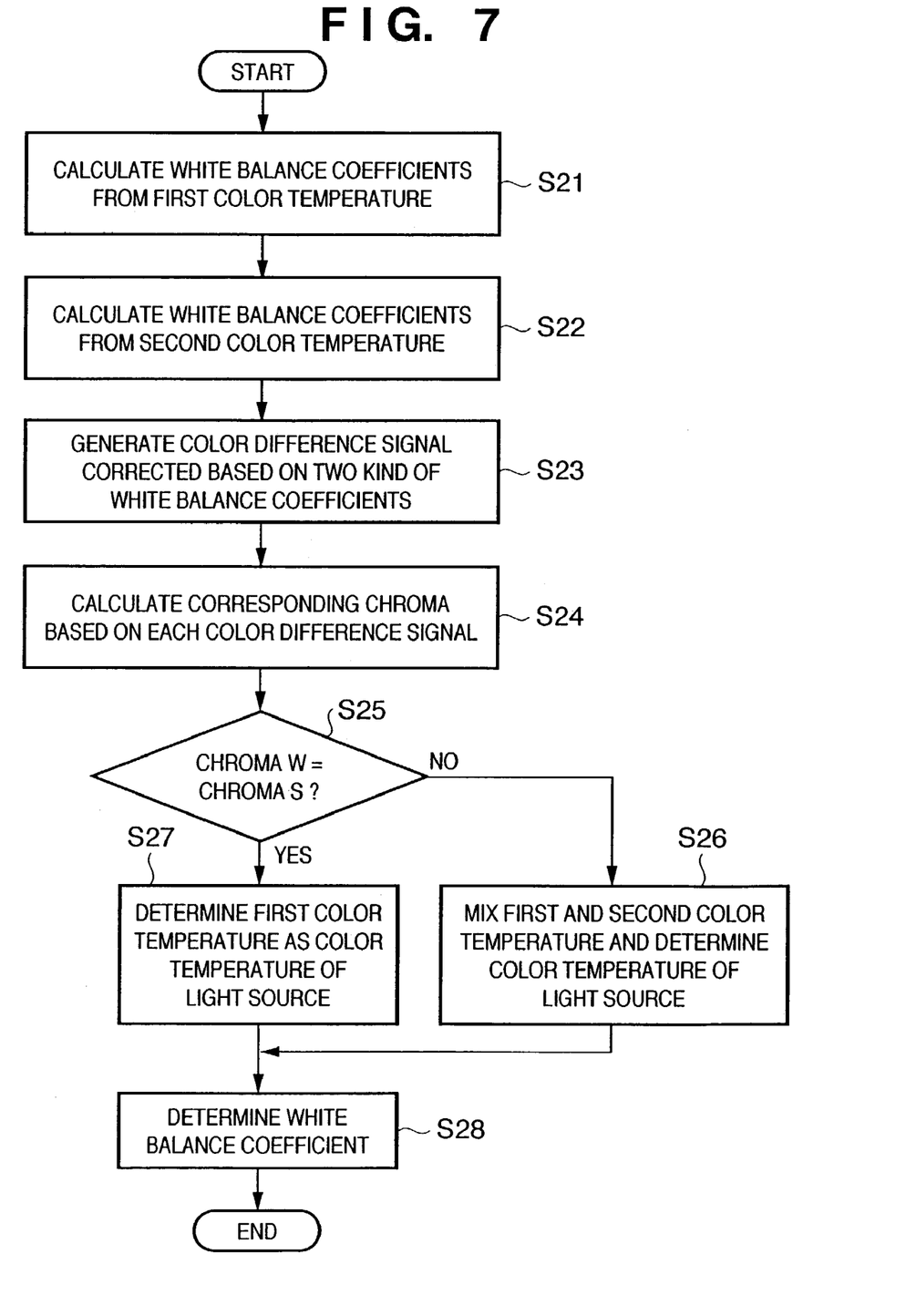
FIG. 7 is a flow chart showing the operation of the white balance device in the second embodiment.

The second embodiment will be explained with reference to FIG. 7 showing the white balance process of the image pickup device in this second embodiment.

Color pixel output values Rw, Gw, and Bw of an image sensing element are calculated backward by solving simultaneous equations (1) from SumCxW and SumCyW corresponding to color temperatures by white detection.

White balance coefficients WB_Rw, WB_Gw, and WB_Bw from white are calculated from the values Rw, Gw, and Bw (Step S21):

$$WB\_Rw = 1.0/Rw$$

$$WB\_Gw = 1.0/Gw$$

$$WB\_Bw = 1.0/Bw \quad (12)$$

CxFromSkin and CyFromSkin along the white detection axis are calculated from a color temperature CTempFromSkin by skin detection. Values Rs, Gs, and Bs are calculated from CxFromSkin and CyFromSkin by similarly solving simultaneous equations. White balance coefficients WB_Rs, WB_Gs, and WB_Bs from the skin are calculated from the values Rs, Gs, and Bs (Step S22):

$$WB\_Rs = 1.0/Rs$$

$$WB\_Gs = 1.0/Gs$$

$$WB\_Bs = 1.0/Bs \quad (13)$$

Figure 4:
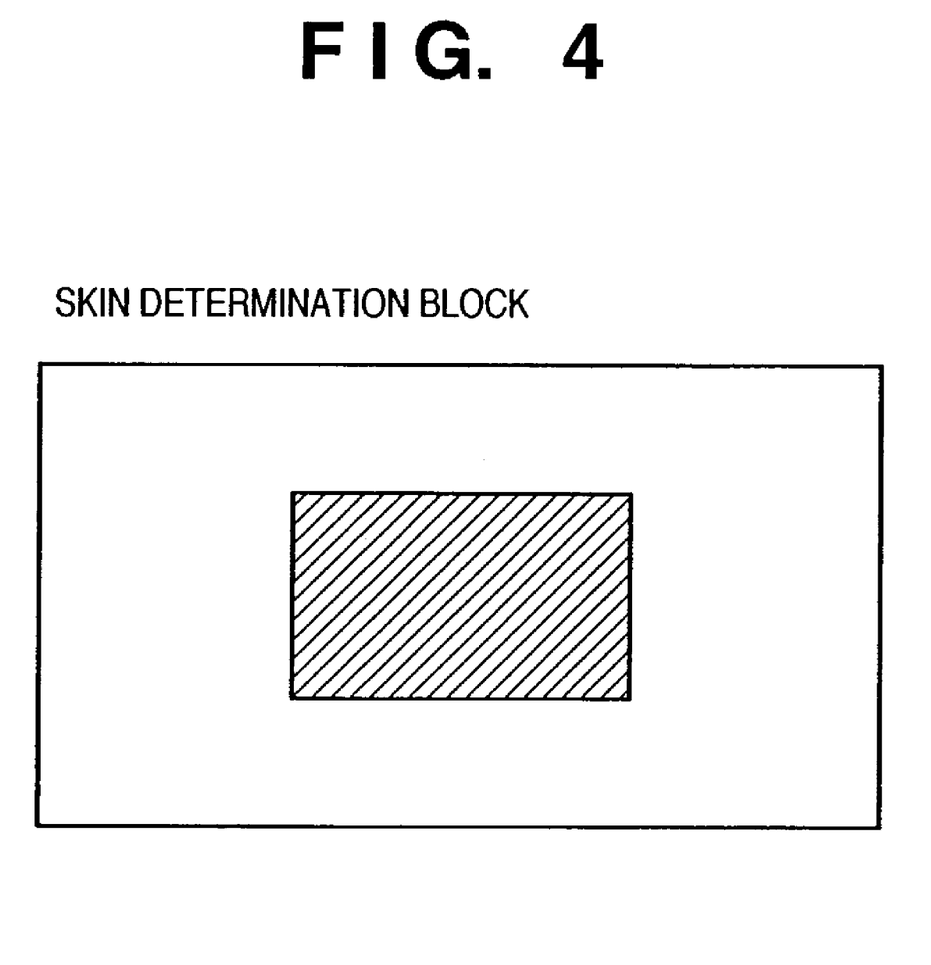
FIG. 4 is a view showing a skin determination block.

White balance correction is performed on the basis of the two WB coefficients for a color signal obtained within a block (center of a frame as shown in FIG. 4) designated in advance in the frame. Color difference signals are generated from the corrected signals, and the averages of the color difference signals are calculated (Step S23). Color difference signals are calculated from signals corrected based on the white balance coefficients from white. The sums of the absolute values of the color different signals are averaged into $$AveCrw, AveCbw \quad (14)$$

Color difference signals are calculated from signals corrected based on the white balance coefficients from the skin. The sums of the absolute values of the color different signals are averaged into $$AveCrs, AveCbs \quad (15)$$

From these values, chromas are calculated (Step S25):

$$ChromaW = sqrt(AveCrw1^2 + AveCbw1^2)$$

$$ChromaS = sqrt(AveCrs1^2 + AveCbs1^2) \quad (16)$$

If the WB coefficients by white detection are correct (not deviate to the skin), $$ChromaW = ChromaS \quad (17)$$

If white detection deviates to the skin, the WB coefficients so act as to adjust the skin color to an achromatic color. When the human skin exists at the center of the frame, $$\text{ChromaW} < \text{ChromaS} \quad (18)$$

When equation (17) is established, the color temperature from white search is output (Step S27). When inequality (18) is established, the final object color temperature is predicted using a weighted average, similar to the first embodiment (Step S26):

$$CTempResult = k \times CTempFromSkin + (1-k) \times CTempFromWhite \quad (19)$$

In equation (19), k, CTempResult, CTempFromSkin, and CTempFromWhite have the same meanings as those in the first embodiment.

(19) means the greater deal of skin signals is detected, the much importance is CtempFromSkin regarded as. For example, If all signals in an picked up image are skin signals, CtempResult is adopted only CtempFromSkin obtained from the skin detection area. Therefore, the present embodiment can properly perform to adjust white balance of a picked up image even if white signals isn't detected in the picked up image.

As described above, coefficients to adjust white balance are determined (Step S28).

In addition, weighted average between CtempFromWhite and CtempFromSkin may be obtained not only in case of CtempFromWhite<CtemFromSkin, but also in case of CtempFromWhite≧CtempFromSkin. This process is simpler than the process as described above.

Furthermore, there is a possibility that the reliability of CtempResult is low because the detected skin signals will be a few in Step S25. In this case, the reliability of CtempResult may be higher by pre-process of Step S25 as described below. In the pre-process of Step S25, if the number of skin signals detected from the skin detecting area is smaller than a predetermined number (for example, SkinSamplePercent=1%.), the process in Step S27 will be performed. Otherwise, the process in Step S25 will be performed.

As described above, the present embodiment can properly perform to adjust white balance of a picked up image.

(Third Embodiment)

The third embodiment is different from the first embodiment in the method (Step S5 in FIG. 5) of mixing an object color temperature by white detection and an object color temperature by skin detection.

The total number of blocks of an image sensing element subjected to skin detection is represented by $$\text{AllBlockNum} \quad (20)$$

A ratio WBlockPercent of blocks determined to be white is calculated using AllBlockNum and the number SampleWNum of blocks falling within the white detection range:

$$WBlockPercent = SampleWNum / AllBlockNum \times 100 \quad (21)$$

The final object color temperature (CTempResult) is calculated by the following weighted addition using the above ratio:

EXAMPLE if (WBlockPercent>10%)

$$CTempResult = CTempFromWhite \quad (22)$$

else

CTempResult $$= WhiteRatio \times CTempWhite + (1-WhiteRatio)$$

$$\times CTempFromSkin$$

To attain WhiteRatio=1.0 for WBlockPercent=10% and WhiteRatio=0.0 for WBlockPercent=0%, WhiteRatio is calculated by a linear function:

$$WhiteRatio = a \times WBlockPercent + b \quad (23)$$

The third embodiment adopts the skin color for white detection and chromatic color detection, but the same effects can also be obtained in the use of the green of a leaf or the like or the blue of a blue sky or the like, in addition to the skin color.

(Fourth Embodiment)

The fourth embodiment is different from the first embodiment in the method (Step S5 in FIG. 5) of mixing an object color temperature by white detection and an object color temperature by skin detection.

In the fourth embodiment, when the photographing mode of a camera is designated to the portrait mode (person photographing mode), the white balance is adjusted using object color temperature information obtained by skin detection.

Alternatively, when the photographing mode of the camera is the portrait mode, weighing of increasing the ratio of the coefficient k in the mixing equation is executed.

As described above, according to the first to fourth embodiments, the final object color temperature is specified in consideration of color temperature information from a skin color detection means in addition to color temperature information from a white detection means used in a conventional white balance device. Even when the white area is small in a close-up shot of a human face or the like, the color temperature can be accurately determined.

A deviation to the skin color can be prevented for a relatively-low-illuminance object whose skin color has conventionally been misjudged as white and erroneously corrected to white.

For a bright object, the white detection range need not be narrowed, unlike the conventional white balance device. The white balance of tungsten light with a very high illuminance in a studio or the like can be appropriately corrected.

[Other Embodiment]

The object of each embodiment is also achieved when a storage medium (or recording medium) which stores software program codes for realizing the functions of the embodiment is supplied to a system or apparatus, and the computer (or the CPU or MPU) of the system or apparatus reads out and executes the program codes stored in the storage medium. In this case, the program codes read out from the storage medium realize the functions of the above-described embodiments, and the storage medium which stores the program codes constitutes the present invention. The functions of the above-described embodiments are realized when the computer executes the readout program codes. Also, the functions of the above-described embodiments are realized when an OS (Operating System) running on the computer performs part or all of actual processing on the basis of the instructions of the program codes.

The functions of the above-described embodiments are also realized when the program codes read out from the storage medium are written in the memory of a function expansion card inserted into the computer or the memory of a function expansion unit connected to the computer, and the CPU of the function expansion card or function expansion unit performs part or all of actual processing on the basis of the instructions of the program codes.

When the present invention is applied to the storage medium, the storage medium stores program codes corresponding to the above-described flow chart.

As has been described above, the above-described embodiments can always provide accurate white balance regardless of image sensing conditions.

The present invention is not limited to the above embodiments and various changes and modifications can be made within the spirit and scope of the present invention. Therefore, to apprise the public of the scope of the present invention the following claims are mode.

What is claimed is:

1. A white balance adjustment method comprising:
   a first color temperature calculation step of calculating a first color temperature from an image signal within a white detection range out of image signals from an image sensing element;
   a second color temperature calculation step of calculating a second color temperature from an image signal within a chromatic color detection range out of image signals from the image sensing element; and
   a white balance adjustment step of adjusting white balance on the basis of the first and second color temperatures, wherein the first and second color temperatures are compared;
   when the first color temperature is substantially equal to the second color temperature or the first color temperature is higher than the second color temperature, the first color temperature is determined as a color temperature of a light source; and
   when the second color temperature is higher than the first color temperature, the second color temperature is determined as the color temperature of the light source.

2. A white balance adjustment method comprising:
   a first color temperature calculation step of calculating a first color temperature from an image signal within a white detection range out of image signals from an image sensing element;
   a second color temperature calculation step of calculating a second color temperature from an image signal within a chromatic color detection range out of image signals from the image sensing element; and
   a white balance adjustment step of adjusting white balance on the basis of the first and second color temperatures, wherein, the first and second color temperatures are compared;
   when the first color temperature is substantially equal to the second color temperature or the first color temperature is higher than the second color temperature, the first color temperature is determined as a color temperature of a light source; and
   when the second color temperature is higher than the first color temperature, weighted averages of the first and second color temperatures are calculated on the basis of a ratio of a white color range which occupies the image signal and a ratio of a chromatic color, thereby determining the color temperature of the light source.

3. A white balance adjustment method comprising:
   a first color temperature calculation step of calculating a first color temperature from an image signal within a white detection range out of image signals from an image sensing element;
   a second color temperature calculation step of calculating a second color temperature from an image signal within a chromatic color detection range out of image signals from the image sensing element; and
   a white balance adjustment step of adjusting white balance on the basis of the first and second color temperatures, wherein a first white balance coefficient is calculated from the first color temperature, the image signal being corrected by the first white balance coefficient, and a first chroma value is calculated from the corrected image signal;
   a second white balance coefficient is calculated from the second color temperature, the image signal being corrected by the second white balance coefficient, and a second chroma value is calculated from the corrected image signal; and
   the white balance is adjusted by a white balance coefficient corresponding to a larger one of the first and second chroma values.

4. A white balance adjustment method comprising:
   a first color temperature calculation step of calculating a first color temperature from an image signal within a white detection range out of image signals from an image sensing element;
   a second color temperature calculation step of calculating a second color temperature from an image signal within a chromatic color detection range out of image signals from the image sensing element; and
   a white balance adjustment step of adjusting white balance on the basis of the first and second color temperatures, wherein a first white balance coefficient is calculated from the first color temperature, the image signal being corrected by the first white balance coefficient, and a first chroma value is calculated from the corrected image signals;
   a second white balance coefficient is calculated from the second color temperature, the image signal being corrected by the second white balance coefficient, and a second chroma value is calculated from the corrected image signal; and
   weighted averages of the first and second chroma values are calculated to determine a white balance coefficient.

5. A white balance adjustment method comprising:
   a first color temperature calculation step of calculating a first color temperature from an image signal within a white detection range out of image signals from an image sensing element;
   a second color temperature calculation step of calculating a second color temperature from an image signal within a chromatic color detection range out of image signals from the image sensing element; and
   a white balance adjustment step of adjusting white balance on the basis of the first and second color temperatures, wherein a ratio of a white color range which occupies the image signal is calculated;
   when the ratio of the white color range is higher than a predetermined value, the first color temperature is determined as a color temperature of a light source; and
   when the ratio of the white color range is lower than the predetermined value, weighted averages of the first and second color temperatures are calculated to determine the color temperature of the light source.

6. A white balance adjustment method comprising:
   a first color temperature calculation step of calculating a first color temperature from an image signal within a white detection range out of image signals from an image sensing element;

a second color temperature calculation step of calculating a second color temperature from an image signal within a chromatic color detection range out of image signals from the image sensing element, wherein the chromatic color includes a skin color; and a white balance adjustment step of adjusting white balance on the basis of the first and second color temperatures, wherein when a photographing mode of an image sensing apparatus is set to a person photographing mode, a weight of the second color temperature is increased; and a weighted average of the resultant second color temperature and the first color temperature is calculated to determine a color temperature of a light source.

7. A white balance adjustment apparatus comprising:

a first color temperature calculation unit for calculating a first color temperature from an image signal within a white detection range out of image signals from an image sensing element;

a second color temperature calculation unit for calculating a second color temperature from an image signal within a chromatic color detection range out of image signals from the image sensing element; and a white balance adjustment unit for adjusting white balance on the basis of the first and second color temperatures, wherein the first and second color temperatures are compared;

when the first color temperature is substantially equal to the second color temperature or the first color temperature is higher than the second color temperature, the first color temperature is determined as a color temperature of a light source; and when the second color temperature is higher than the first color temperature, the second color temperature is determined as the color temperature of the light source.

8. A white balance adjustment apparatus comprising:

a first color temperature calculation unit for calculating a first color temperature from an image signal within a white detection range out of image signals from an image sensing element;

a second color temperature calculation unit for calculating a second color temperature from an image signal within a chromatic color detection range out of image signals from the image sensing element; and a white balance adjustment unit for adjusting white balance on the basis of the first and second color temperatures, wherein the first and second color temperatures are compared;

when the first color temperature is substantially equal to the second color temperature or the first color temperature is higher than the second color temperature, the first color temperature is determined as a color temperature of a light source; and when the second color temperature is higher than the first color temperature, weighted averages of the first and second color temperatures are calculated on the basis of a ratio of a white color range which occupies the image signal and a ratio of a chromatic color, thereby determining the color temperature of the light source.

9. A white balance adjustment apparatus comprising:

a first color temperature calculation unit for calculating a first color temperature from an image signal within a white detection range out of image signals from an image sensing element;

a second color temperature calculation unit for calculating a second color temperature from an image signal within a chromatic color detection range out of image signals from the image sensing element; and a white balance adjustment unit for adjusting white balance on the basis of the first and second color temperatures, wherein a first white balance coefficient is calculated from the first color temperature, the image signal being corrected by the first white balance coefficient, and a first chroma value is calculated from the corrected image signal;

a second white balance coefficient is calculated from the second color temperature, the image signal being corrected by the second white balance coefficient, and a second chroma value is calculated from the corrected image signal; and the white balance is adjusted by a white balance coefficient corresponding to a larger one of the first and second chroma values.

10. A white balance adjustment apparatus comprising:

a first color temperature calculation unit for calculating a first color temperature from an image signal within a white detection range out of image signals from an image sensing element;

a second color temperature calculation unit for calculating a second color temperature from an image signal within a chromatic color detection range out of image signals from the image sensing element; and a white balance adjustment unit for adjusting white balance on the basis of the first and second color temperatures, wherein a first white balance coefficient is calculated from the first color temperature, the image signal being corrected by the first white balance coefficient, and a first chroma value is calculated from the corrected image signal;

a second white balance coefficient is calculated from the second color temperature, the image signal being corrected by the second white balance coefficient, and a second chroma value is calculated from the corrected image signal; and weighted averages of the first and second chroma values are calculated to determine a white balance coefficient.

11. A white balance adjustment apparatus comprising:

a first color temperature calculation unit for calculating a first color temperature from an image signal within a white detection range out of image signals from an image sensing element;

a second color temperature calculation unit for calculating a second color temperature from an image signal within a chromatic color detection range out of image signals from the image sensing element; and a white balance adjustment unit for adjusting white balance on the basis of the first and second color temperatures, wherein a ratio of a white color range which occupies the image signal is calculated;

when the ratio of the white color range is higher than a predetermined value, the first color temperature is determined as a color temperature of a light source; and when the ratio of the white color range is lower than the predetermined value, weighted averages of the first and second color temperatures are calculated to determine the color temperature of the light source.

12. A white balance adjustment apparatus comprising:

a first color temperature calculation unit for calculating a first color temperature from an image signal within a white detection range out of image signals from an image sensing element;

a second color temperature calculation unit for calculating a second color temperature from an image signal within a chromatic color detection range out of image signals from the image sensing element, wherein the chromatic color includes a skin color; and a white balance adjustment unit for adjusting white balance on the basis of the first and second color temperatures, wherein when a photographing mode of an image sensing apparatus is set to a person photographing mode, a weight of the second color temperature is increased; and a weighted average of the resultant second color temperature and the first color temperature is calculated to determine a color temperature of a light source.

* * * * *